(12) United States Patent
Von Rauner et al.

(10) Patent No.: US 9,939,852 B1
(45) Date of Patent: Apr. 10, 2018

(54) HINGE ASSEMBLY (71) Applicant: Microsoft Technology Licensing, LLC, Redmond, WA (US)

(72) Inventors: Tapani Von Rauner, Bellevue, WA (US); Joel James Schmelzle, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/589,938

(22) Filed: May 8, 2017

(51) Int. Cl.
*G06F 1/16* (2006.01)
*E05D 11/00* (2006.01)
*A44C 5/14* (2006.01)
*E05D 3/06* (2006.01)
*A44C 5/00* (2006.01)

(52) U.S. Cl.
CPC ............ *G06F 1/1683* (2013.01); *G06F 1/163* (2013.01); *G06F 1/1616* (2013.01); *G06F 1/1681* (2013.01); *A44C 5/0007* (2013.01); *A44C 5/14* (2013.01); *E05D 3/06* (2013.01); *E05D 11/0081* (2013.01); *E05Y 2900/606* (2013.01)

(58) Field of Classification Search
CPC .............................. G06F 1/1681; G06F 1/1683
USPC ..................................................... 361/679.28
See application file for complete search history.

(56) References Cited

U.S. PATENT DOCUMENTS

| 4,996,522 A * | 2/1991 | Sunano ............... G06F 15/0216 235/1 D |
| 5,177,672 A * | 1/1993 | Ito ........................ G06F 1/1616 361/741 |
| 5,742,484 A | 4/1998 | Gillette et al. |
| 5,927,997 A * | 7/1999 | Ruland ................. G06F 1/1616 361/679.27 |
| 7,577,467 B2 | 8/2009 | Schechtel et al. |
| 7,877,866 B1 | 2/2011 | Greenberg et al. |
| 9,137,891 B2 | 9/2015 | Gibbs et al. |
| 9,548,576 B2 | 1/2017 | Sharma et al. |
| 2004/0264118 A1 * | 12/2004 | Karidis ................. G06F 1/1616 361/679.55 |

(Continued)

FOREIGN PATENT DOCUMENTS

WO 2016179304 A1 11/2016

OTHER PUBLICATIONS

"Practical Design Guidelines for Flex", http://web.archive.org/web/20121030042950/http:/www.pcb3d.com/uploads/Flex_Design_Guidelines.pdf, Published on: Oct. 30, 2012, pp. 75-116.

*Primary Examiner* — Adrian S Wilson
(74) *Attorney, Agent, or Firm* — Alleman Hall Creasman & Tuttle LLP (57) ABSTRACT

A hinge assembly comprises a first component including a moveable tensioning guide and a second component connected to the first component such that the first and second components are moveable relative to one another. A flexible interconnect runs between the first component and the second component. The flexible interconnect is routed around the moveable tensioning guide of the first component such that movement of the first component relative to the second component causes movement of the tensioning guide. Movement of the tensioning guide modifies a flexible path taken by the flexible interconnect during movement of the first and second components.

20 Claims, 5 Drawing Sheets

(56) References Cited

U.S. PATENT DOCUMENTS

| | | | |
|---|---|---|---|
| 2008/0013265 A1* | 1/2008 | Kim | G06F 1/1601 |
| | | | 361/679.04 |
| 2008/0026802 A1 | 1/2008 | Carlson | |
| 2012/0120618 A1 | 5/2012 | Bohn | |
| 2013/0058048 A1* | 3/2013 | Choi | G06F 1/1624 |
| | | | 361/727 |
| 2014/0213324 A1* | 7/2014 | Tan | H04M 1/0268 |
| | | | 455/566 |
| 2014/0293519 A1* | 10/2014 | Wang | G06F 1/1616 |
| | | | 361/679.01 |
| 2016/0014915 A1 | 1/2016 | Posner et al. | |
| 2016/0048036 A1 | 2/2016 | Cazalet | |
| 2016/0327993 A1* | 11/2016 | Garelli | G06F 1/203 |

* cited by examiner

HINGE ASSEMBLY

BACKGROUND

Many electronic devices incorporate hinges, or other suitable mechanisms, to enable components of the electronic device to move or fold relative to one another. As an example, laptop computers typically include hinges allowing the display to be tilted at different angles, or folded flat against the base. Such hinges often include one or more flexible electronic interconnects that pass data and/or power through the hinge, even as the hinge is manipulated.

DETAILED DESCRIPTION

As indicated above, flexible interconnects can pass data and/or power between two components of an electronic device connected via a hinge, or other suitable mechanism. Many electronic devices use flexible printed circuits (FPCs) for this purpose. However, FPCs, as well as other types of flexible interconnects, can experience mechanical strain as the hinge is manipulated. For example, movement of a hinge may cause one connection point of a flexible interconnect to move relative to the other, thereby altering the flexible path the flexible interconnect must take between the two connection points (e.g., the path that the interconnect is forced into). This can either increase the tension applied to the flexible interconnect, or introduce additional slack, thereby allowing the flexible interconnect to buckle. Over time, this strain can damage and break the flexible interconnect, potentially causing the electronic device to stop functioning. This problem can be at least partially alleviated by reinforcing parts of the flexible interconnect, or constructing the flexible interconnect from materials that are more resistant to mechanical strain, though this can increase the expense and/or bulk of the electronic device.

Accordingly, the present disclosure is directed to a hinge assembly for connecting one component of an electronic device to another, such that the two components can move relative to one another. The hinge assembly includes at least one a moveable tensioning guide, and a flexible interconnect passing between the two components is routed around the moveable tensioning guide. As the hinge is manipulated, movement of the moveable tensioning guide modifies a flexible path of the flexible interconnect. By modifying the flexible path of the flexible interconnect, the flexible interconnect may be exposed to less mechanical strain as the hinge moves. As an example, movement of the tensioning guide may take up slack of the flexible interconnect, thereby influencing the path so as to prevent buckling, or reduce tension on the flexible interconnect to prevent stretching. The hinge assembly described herein may therefore be implemented in connection with a variety of electronic devices, allowing for management of extra length in the flexible interconnect required to enable certain hinge dynamics without increasing bulk.

Figure 1A:
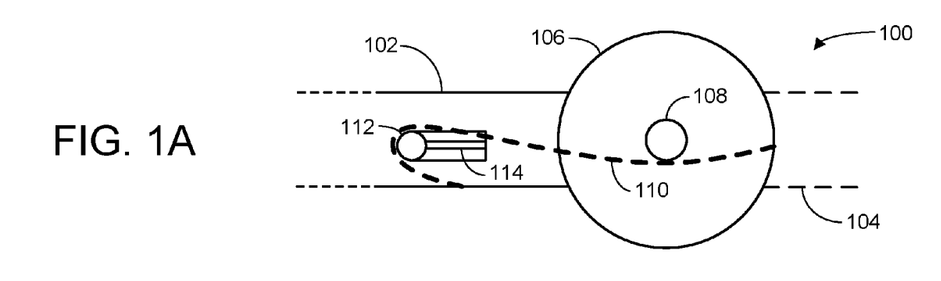
FIGS. 1A and 1B schematically show manipulation of a hinge assembly including a tensioning guide.

FIG. 1A schematically shows an example hinge assembly 100. Hinge assembly 100 includes a first component 102 and a second component 104 connected to the first component via a hinge 106, such that the first and second components are moveable relative to one another. Hinge 106 includes a single pivot 108, though more complex hinges may include multiple pivots, as will be described in more detail below. Hinge assembly 100 may be used in any suitable electronic device incorporating moveable or foldable components, such as a laptop computer, portable phone, tablet, gaming system, wearable device, etc. As used herein, the word "hinge" refers to any suitable coupling between at least two components of a device that allows the components to move relative to one another. Such movement need not be constrained to any particular axis, and in some cases a hinge may allow for pivoting/rotational movement through multiple axes.

As shown, hinge assembly 100 includes a flexible interconnect 110 running between the first and second components. Flexible interconnect 110 may be configured to pass data and/or power through the connection between the first and second components. For example, in the case where hinge assembly 100 is incorporated within a laptop computer, the flexible interconnect 110 may pass data and power between the laptop display and processing components of the laptop. In some cases, flexible interconnect 110 may be a flexible printed circuit (FPC), though flexible interconnect 110 may take other suitable forms, such as a cable or wire.

As the first and/or second components move relative to one another, the path of flexible interconnect 110 will change, potentially introducing the flexible interconnect to mechanical strain, as described above. In many cases, a flexible interconnect may be able to occupy any of a plurality of different paths between the two components, depending on the length of the flexible interconnect, its flexibility, materials and other properties, and any obstacles present between the two components. Some of those paths may expose the flexible interconnect to more strain than others. For example, movement of one component to relative to another may force the flexible interconnect to take a less direct path from one component to the other, placing additional tension on the electronic interconnect. In another scenario, movement of one component relative to another may allow the flexible interconnect to take a more direct path, allowing the flexible interconnect to go slack and buckle unpredictably.

Accordingly, first component 102 includes a moveable tensioning guide 112, with flexible interconnect 110 being routed around the moveable tensioning guide. The tensioning guide serves to control movement of the flexible interconnect as the hinge is manipulated, causing the flexible interconnect to move in a predictable way that reduces stress placed on the flexible interconnect.

In many cases, movement of the tensioning guide—i.e., during movement of the first component relative to the second component—reduces the stress placed on the flexible interconnect. As shown in FIG. 1A, tensioning guide 112 is occupying a position away from hinge 106, thereby maintaining tension on the flexible interconnect and taking up slack. Should sufficient force be applied to the moveable tensioning guide by the flexible interconnect, the tensioning guide may move, thereby changing the flexible path of the flexible interconnect to a different path that places less strain on the interconnect. The moveable tensioning guide thereby serves to place the flexible interconnect in less-straining paths than it would otherwise occupy during movement of the hinge.

In some cases, movement of tensioning guide 112 may be directed by a suitable bias mechanism, such as mechanism 114. For example, bias mechanism 114 may bias the tensioning guide toward the position shown in FIG. 1A, such that the tensioning guide automatically moves to take in slack of the flexible interconnect. Accordingly, movement of the tensioning guide may occur when force is applied to the tensioning guide sufficient to overcome the biasing force applied to the bias mechanism. Bias mechanism 114 may take any suitable form, and may include, for example, one or more springs, or other suitable mechanisms for biasing a tensioning guide toward a particular position.

Figure 1B:
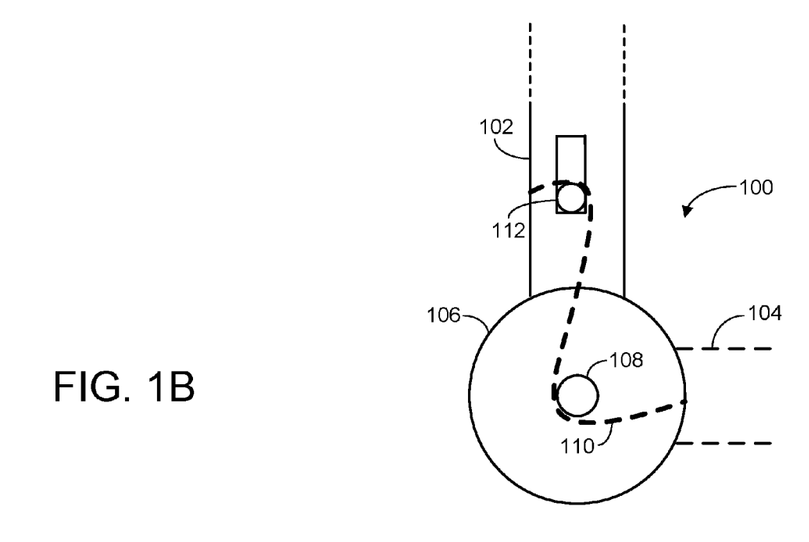

Movement of the tensioning guide is illustrated in FIG. 1B, in which first component 102 has been moved to a new position relative to second component 104. This has changed the position of flexible interconnect 110, forcing it to take a less direct path from its connection point on the first component to its connection point on the second component. The resulting increased tension on the flexible interconnect is applied to the tensioning guide, overcoming the biasing force applied by the bias mechanism and causing the tensioning guide to move to a new position closer to hinge 106. This modifies the flexible path of the flexible interconnect, allowing the flexible interconnect to take a more direct path to the second component than would be possible if the tensioning guide remained at its original position. This has the effect of reducing the tension applied to the flexible interconnect, and thereby reducing the amount of strain the flexible interconnect is exposed to as the hinge is actuated.

Though a specific movement of the first component relative to the second component is shown in FIGS. 1A and 1B, it will be understood that movement of a tensioning guide may occur during other types of movement as well. For example, if the first component is moved from its position in FIG. 1B back to its position in FIG. 1A, the flexible interconnect will be allowed to take a more direct path between the two components. This will reduce the force applied to the tensioning guide by the flexible interconnect, and the biasing force applied by the bias mechanism will move the tensioning guide back toward the position shown in FIG. 1A. This will have the effect of "taking up slack" of the flexible interconnect as the hinge is actuated, preventing the flexible interconnect from buckling unpredictably.

Hinge assemblies having different ranges of motion from hinge assembly 100 may incorporate moveable tensioning guides that move in different ways. In some examples, more complex hinge assemblies may include moveable tensioning guides that can move in multiple directions.

It will be understood that hinge assembly 100 and its assorted components are shown schematically and presented for the sake of providing non-limiting examples. The specific sizes, shapes, and structures of hinge assembly 100 and its assorted components may vary from implementation to implementation as necessary. In particular, hinge 106, pivot 108, flexible interconnect 110, tensioning guide 112, and bias mechanism 114 may take any suitable form while still performing the functions described above.

Figure 2:
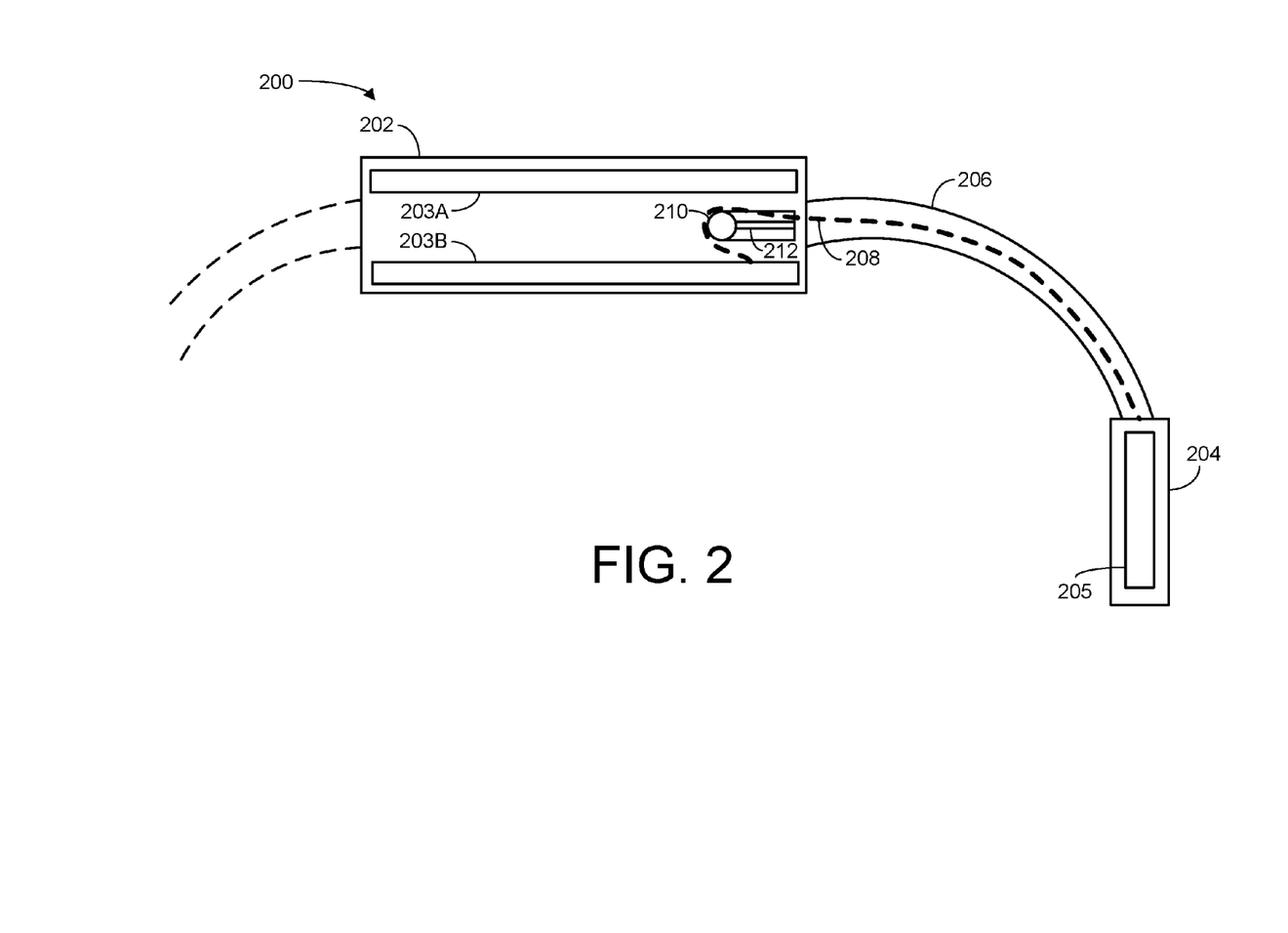
FIG. 2 schematically shows an example wearable computing device.

Hinge assemblies as described herein may be incorporated into any of a variety of suitable electronic devices. Accordingly, FIG. 2 schematically shows an example wearable computing device 200 incorporating a hinge assembly as described above. In some cases, wearable computing device 200 may be sized and shaped to be worn on a human wrist as a "smartwatch," for example. It will be understood that other types of wearable computing devices may incorporate similar hinges, and are supported by this disclosure.

Wearable computing device 200 includes a first component 202 that is moveably coupled to a second component 204 via a flexible band 206. Each of first component 202 and second component 204 include various computer components of the wearable computing device. Specifically, first component 202 includes computer components 203A and 203B, while second component 204 includes computer component 205. Such computer components may include, for example, a display, processor, storage device, battery, sensors, etc. In some cases, first component 202 may represent a "primary" component, including a user-facing display, a processor, a storage device, etc., while second component 204 includes one or more sensors of the wearable computing device.

Wearable computing device 200 also includes a flexible interconnect 208 disposed within the flexible band connecting the first component to the second component. Flexible interconnect 208 may be configured to pass one or both of power and data between the first and second components of the wearable computing device. For example, power may be provided to second component 204 via a battery in first component 202, while data from component 205 (e.g., a sensor) is provided to processing components in first component 202.

As wearable computing device 200 is worn, frequent manipulation/stretching of flexible band 206 may occur, for example as a user adjusts or removes the device. Further, some amount of stretching of the flexible band may be necessary in order to ensure that the wearable device can fit on a variety of different wrist sizes and/or provide a desired snugness (e.g., to ensure appropriate contact of a sensor with the wearer's skin). Over time, this can strain, deform, and damage the flexible interconnect, potentially interfering with the function of the wearable device.

Accordingly, wearable computing device 200 includes a moveable tensioning guide 210, and flexible interconnect 208 is routed around the moveable tensioning guide. Should tension be applied to the flexible interconnect (e.g., as a user stretches the flexible band to put it on his/her wrist), the flexible interconnect may apply a force to the tensioning guide, causing it to move toward the flexible band. This movement of the tensioning guide provides more slack to the flexible interconnect, enabling the flexible band to stretch without placing excess strain on the flexible interconnect. In some cases, wearable computing device 200 may additionally include a bias mechanism 212, which may function similarly to bias mechanism 114 described above with respect to FIGS. 1A and 1B.

Figure 3A:
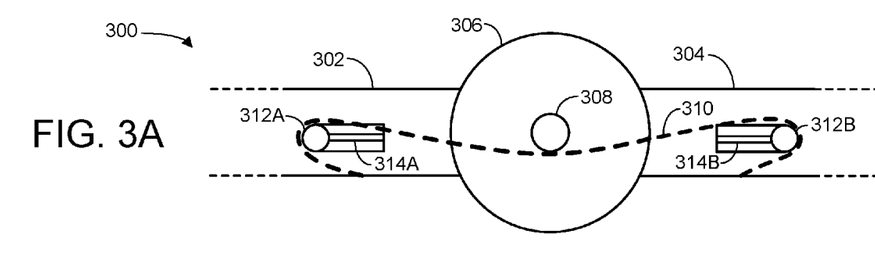
FIGS. 3A and 3B schematically show manipulation of a hinge assembly including two tensioning guides.
Figure 3B:
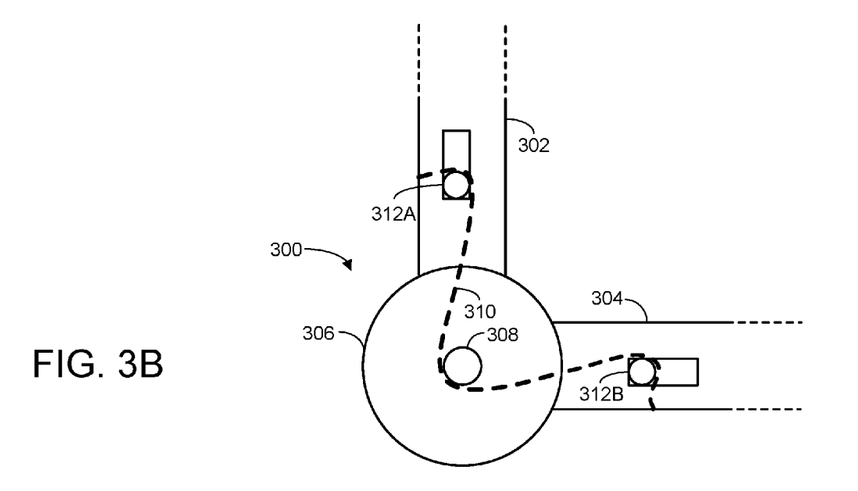

In some cases, the same flexible interconnect may be routed around multiple moveable tensioning guides. This is illustrated in FIGS. 3A and 3B, which show an example hinge assembly 300 having a first component 302 and a second component 304, moveably connected via a hinge 306 having a single pivot 308. A flexible interconnect 310 runs between the first and second components. In hinge assembly 300, first component 302 includes a first moveable tensioning guide 312A, and second component 304 includes a second moveable tensioning guide 312B. Flexible interconnect 310 is routed around each of the first and second moveable tensioning guides. Each moveable tensioning guide may also include a bias mechanism, such as bias mechanisms 314A and 314B shown in FIG. 3A.

As described above, movement of either the first or second component relative to the other may change the flexible path taken by the flexible interconnect between the two components. In hinge assembly 300, this may result in movement of both of the first and second tensioning guides. In other words, just as movement of the first component relative to the second causes movement of the first tensioning guide, the same movement may also cause movement of the second tensioning guide. This may in turn modify a flexible path taken by the flexible interconnect during movement of the first component. In some cases, movement of the tensioning guide of the first component may be reciprocated by movement of the tensioning guide of the second component. In other words, each tensioning guide may move in the same direction (e.g., toward the hinge) at substantially the same time.

Movement of the two tensioning guides is schematically illustrated in FIG. 3B, in which first component 302 has been moved to a new position relative to second component 304. This has forced the flexible interconnect to take a less direct path between the two components, which has in turn caused the flexible interconnect to apply force to the two tensioning guides. The two tensioning guides have moved to accommodate the flexible interconnect, thereby exposing the flexible interconnect to less strain than if the tensioning guides had not moved.

Figure 4:
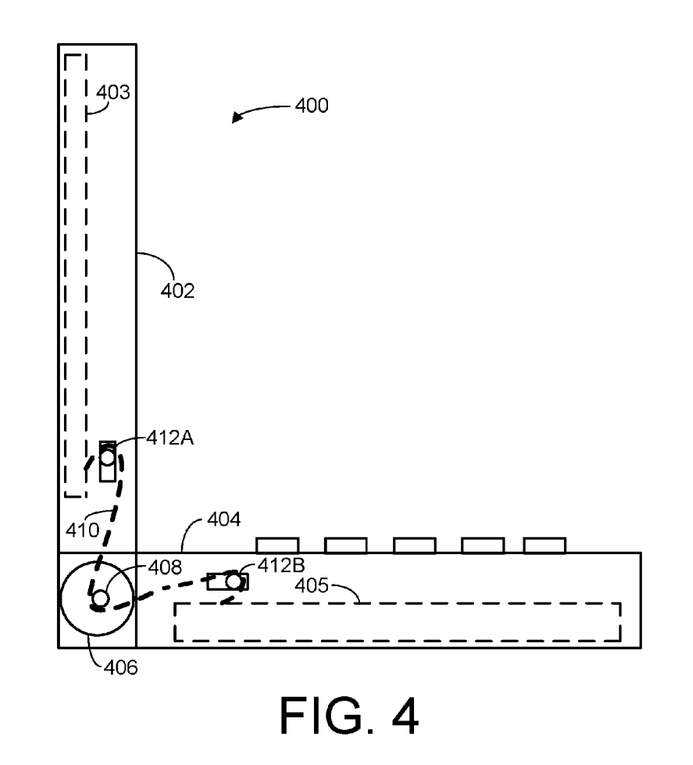
FIG. 4 schematically shows an example computing device.

FIG. 4 schematically shows another example of a computing device 400 incorporating a hinge assembly as described above. Computing device 400 includes a first component 402 and a second component 404 connected via a hinge 406 having a single pivot 408. Hinge 406 enables the first component to move relative to the second component. In some cases, hinge 406 may have a range of motion such that first component 402 can be folded flat against second component 404, such that computing device 400 has a foldable form factor. Accordingly, computing device 400 may represent a laptop computer, gaming device, and/or any other suitable computing device having a foldable form factor. Computing device 400 also includes a computing component 403, stored within first component 402, and another computing component 405, stored within second component 404. These computing components may represent any suitable computer hardware. For example, in the case where computing device 400 is a laptop, then computing component 403 may represent a display, while computing component 405 represents one or more processors, storage devices, batteries, etc.

Computing device 400 also includes a flexible interconnect 410 running between the first and second components. Flexible interconnect 410 is routed around a first tensioning guide 412A of the first component and a second tensioning guide 412B of the second component. Accordingly, movement of the first component relative to the second component (e.g., as a user folds the laptop screen toward the base) may cause movement of the two tensioning guides, thereby modifying a flexible path of the flexible interconnect.

Figure 5:
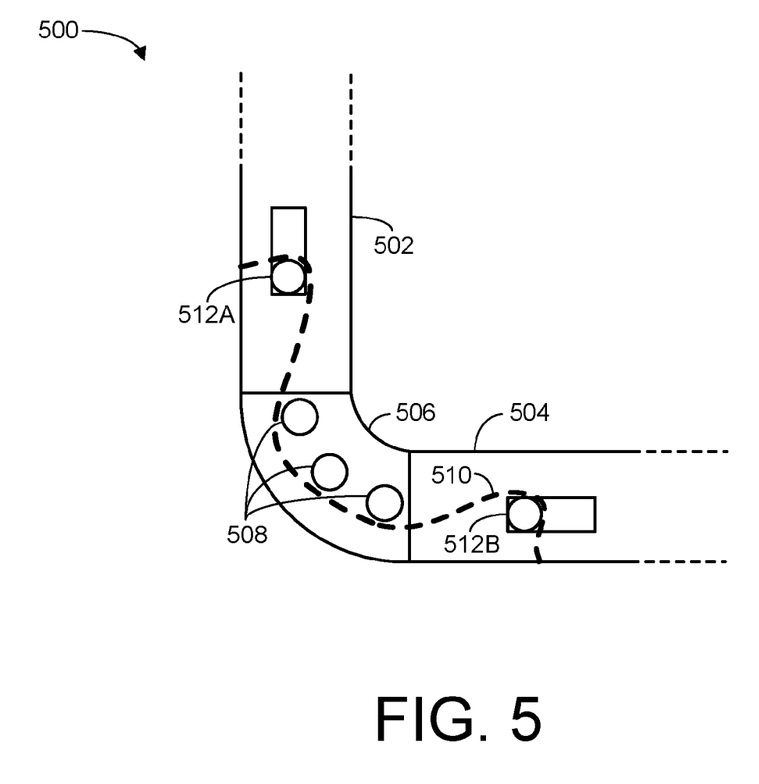
FIG. 5 schematically shows an example hinge assembly having multiple pivots.

In some cases, a hinge assembly as described herein may incorporate more complicated hinges than those described above. Accordingly, FIG. 5 schematically illustrates an example hinge assembly 500, including a first component 502 and a second component 504 connected via a hinge 506. Unlike the hinges described above, hinge 506 includes multiple pivot points 508. This may enable more complicated movements than would be possible with simpler single-pivot hinges. Nevertheless, hinge assembly 500 still includes a flexible interconnect 510 routed around first and second moveable tensioning guides 512A and 512B. As described repeatedly above, movement of the first component relative to the second component may change the path which the flexible interconnect takes between the first and second components. This will result in movement of the two tensioning guides, which will in turn either take up slack of the flexible interconnect, or provide additional slack, serving to reduce the strain placed on the flexible interconnect during actuation of the hinge.

In an example, a hinge assembly comprises: a first component including a moveable tensioning guide; a second component connected to the first component such that the first and second components are moveable relative to one another; and a flexible interconnect running between the first component and the second component, the flexible interconnect routed around the moveable tensioning guide of the first component such that movement of the first component relative to the second component causes movement of the tensioning guide; where movement of the tensioning guide modifies a flexible path taken by the flexible interconnect during movement of the first and second components. In this example or any other example, movement of the tensioning guide is directed by a bias mechanism. In this example or any other example, the flexible interconnect is configured to pass one or both of data and power through the connection between the first component and the second component. In this example or any other example, the flexible interconnect is a flexible printed circuit (FPC). In this example or any other example, the second component includes a second tensioning guide and the flexible interconnect is routed around the second tensioning guide, such that movement of the first component relative to the second component causes movement of the second tensioning guide, thereby modifying a flexible path taken by the flexible interconnect during movement of the first and second components. In this example or any other example, movement of the tensioning guide of the first component is reciprocated by movement of the second tensioning guide. In this example or any other example, the first component includes one or more computer components of a wearable computing device, the second component includes one or more sensors of the wearable computing device, and the flexible interconnect is disposed within a flexible band connecting the first component to the second component. In this example or any other example, the wearable computing device is sized and shaped to be worn on a human wrist. In this example or any other example, the first and second components are components of a computing device having a foldable form factor. In this example or any other example, the computing device is a laptop computer. In this example or any other example, the first and second components are connected via a hinge having a single pivot. In this example or any other example, the first and second components are connected via a hinge having multiple pivots.

In an example, a computing device comprises: a first component having a first moveable tensioning guide; a second component having a second moveable tensioning guide, the second component connected to the first component via a hinge such that the first and second components are moveable relative to one another; and a flexible interconnect running between the first and second components, the flexible interconnect being routed around each of the first and second tensioning guides such that movement of the first component relative to the second component causes movement of the first and second tensioning guides; where movement of the first and second tensioning guides modifies a flexible path taken by the flexible interconnect during movement of the first and second components. In this example or any other example, movement of each of the first and second moveable tensioning guides is directed by bias mechanisms. In this example or any other example, movement of the first tensioning guide is reciprocated by movement of the second tensioning guide. In this example or any other example, the flexible interconnect is configured to pass one or both of data and power through the connection between the first component and the second component. In this example or any other example, the flexible interconnect is a flexible printed circuit (FPC). In this example or any other example, the hinge has multiple pivots. In this example or any other example, the computing device is a laptop computer.

In an example, a hinge assembly comprises: a first component including a moveable tensioning guide and one or more components of a wearable computing device; a second component including one or more sensors of the wearable computing device, the second component connected to the first component via a flexible band such that the first and second components are moveable relative to one another; and a flexible printed circuit (FPC) configured to pass one or both of data and power through the connection between the first and second components via the flexible band, the FPC routed around the moveable tensioning guide of the first component such that movement of the first component relative to the second component causes movement of the tensioning guide; where movement of the tensioning guide modifies a flexible path taken by the flexible interconnect during movement of the first and second components.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A hinge assembly, comprising:
    a first component including a moveable tensioning guide;
    a second component connected to the first component such that the first and second components are moveable relative to one another; and
    a flexible interconnect running between the first component and the second component, the flexible interconnect routed around the moveable tensioning guide of the first component such that movement of the first component relative to the second component causes movement of the tensioning guide;
    where movement of the tensioning guide modifies a flexible path taken by the flexible interconnect during movement of the first and second components.

2. The hinge assembly of claim 1, where movement of the tensioning guide is directed by a bias mechanism.

3. The hinge assembly of claim 1, where the flexible interconnect is configured to pass one or both of data and power through the connection between the first component and the second component.

4. The hinge assembly of claim 3, where the flexible interconnect is a flexible printed circuit (FPC).

5. The hinge assembly of claim 1, where the second component includes a second tensioning guide and the flexible interconnect is routed around the second tensioning guide, such that movement of the first component relative to the second component causes movement of the second tensioning guide, thereby modifying a flexible path taken by the flexible interconnect during movement of the first and second components.

6. The hinge assembly of claim 5, where movement of the tensioning guide of the first component is reciprocated by movement of the second tensioning guide.

7. The hinge assembly of claim 1, where the first component includes one or more computer components of a wearable computing device, the second component includes one or more sensors of the wearable computing device, and the flexible interconnect is disposed within a flexible band connecting the first component to the second component.

8. The hinge assembly of claim 7, where the wearable computing device is sized and shaped to be worn on a human wrist.

9. The hinge assembly of claim 1, where the first and second components are components of a computing device having a foldable form factor.

10. The hinge assembly of claim 9, where the computing device is a laptop computer.

11. The hinge assembly of claim 1, where the first and second components are connected via a hinge having a single pivot.

12. The hinge assembly of claim 1, where the first and second components are connected via a hinge having multiple pivots.

13. A computing device, comprising:
    a first component having a first moveable tensioning guide;
    a second component having a second moveable tensioning guide, the second component connected to the first component via a hinge such that the first and second components are moveable relative to one another; and
    a flexible interconnect running between the first and second components, the flexible interconnect being routed around each of the first and second tensioning guides such that movement of the first component relative to the second component causes movement of the first and second tensioning guides;
    where movement of the first and second tensioning guides modifies a flexible path taken by the flexible interconnect during movement of the first and second components.

14. The computing device of claim 13, where movement of each of the first and second moveable tensioning guides is directed by bias mechanisms.

15. The computing device of claim 13, where movement of the first tensioning guide is reciprocated by movement of the second tensioning guide.

16. The computing device of claim 13, where the flexible interconnect is configured to pass one or both of data and power through the connection between the first component and the second component.

17. The computing device of claim 16, where the flexible interconnect is a flexible printed circuit (FPC).

18. The computing device of claim 13, where the hinge has multiple pivots.

19. The computing device of claim 13, where the computing device is a laptop computer.

20. A hinge assembly, comprising:
    a first component including a moveable tensioning guide and one or more components of a wearable computing device;

a second component including one or more sensors of the wearable computing device, the second component connected to the first component via a flexible band such that the first and second components are moveable relative to one another; and a flexible printed circuit (FPC) configured to pass one or both of data and power through the connection between the first and second components via the flexible band, the FPC routed around the moveable tensioning guide of the first component such that movement of the first component relative to the second component causes movement of the tensioning guide;

where movement of the tensioning guide modifies a flexible path taken by a flexible interconnect during movement of the first and second components.

* * * * *